(12) United States Patent
Shen et al.

(10) Patent No.: US 9,749,788 B2
(45) Date of Patent: *Aug. 29, 2017

(54) POSITIONING MOBILE TERMINAL BASED ON ELECTROMAGNETIC SIGNALS

(71) Applicant: Alibaba Group Holding Limited, Grand Cayman (KY)

(72) Inventors: Hui Shen, Hangzhou (CN); Yunjiao Yao, Hangzhou (CN); Xiao Qian, Hangzhou (CN); Hanbo Ma, Hangzhou (CN); Zhipeng Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/344,367

(22) Filed: Nov. 4, 2016

(65) Prior Publication Data

US 2017/0055114 A1    Feb. 23, 2017

Related U.S. Application Data

(63) Continuation of application No. 14/863,877, filed on Sep. 24, 2015, now Pat. No. 9,532,170.

(30) Foreign Application Priority Data

Sep. 24, 2014    (CN) .......................... 2014 1 0500056

(51) Int. Cl.
*H04W 4/02*        (2009.01)
*H04M 3/42*        (2006.01)
(Continued)

(52) U.S. Cl.
CPC ......... *H04W 4/02* (2013.01); *H04M 3/42348* (2013.01); *H04W 64/006* (2013.01); *H04W 88/02* (2013.01)

(58) Field of Classification Search
CPC ..... H04W 4/02; H04W 64/006; H04W 88/02; H04M 3/42348
See application file for complete search history.

(56) References Cited

U.S. PATENT DOCUMENTS 7,047,014 B1 *  5/2006  Friday ................. H04W 16/18
                                                            345/581
2010/0290504 A1   11/2010 Torimoto et al.
(Continued)

FOREIGN PATENT DOCUMENTS

WO     WO2013065042     5/2013

OTHER PUBLICATIONS

Office action for U.S. Appl. No. 14/863,877, mailed on Apr. 28, 2016, Shen et al., "Positioning Mobile Terminal Based on Electromagnetic Signals", 23 pages.
(Continued)

*Primary Examiner* — Nizar Sivji
(74) *Attorney, Agent, or Firm* — Lee & Hayes, PLLC (57) ABSTRACT

Example positioning techniques include: generating an initial particle set, randomly allocating different moving step lengths for each particle in the initial particle set, updating position information of each particle at a previous moment to obtain a current particle set, rating usability of each particle according to position information of each particle in the current particle set and a signal fingerprint received at a current moment, acquiring a moving step length of each particle having a rating higher than a first predetermined threshold in the current particle set, and updating a moving step length of each particle having a rating lower than the first predetermined threshold according to the acquired moving step length. The techniques of the present disclosure obtain a moving step length closest to the actual step length
(Continued)

of a person, and update the moving step length in time with the change of the step length of the person.

19 Claims, 4 Drawing Sheets

(51) Int. Cl.
  *H04W 64/00* (2009.01)
  *H04W 88/02* (2009.01)

(56) References Cited

U.S. PATENT DOCUMENTS

| | | |
|---|---|---|
| 2013/0091288 A1 | 4/2013 | Shalunov et al. |
| 2013/0203423 A1* | 8/2013 | Alles ................ G01S 1/022 |
| | | 455/446 |
| 2013/0217332 A1* | 8/2013 | Altman ................ H04H 60/90 |
| | | 455/41.2 |
| 2013/0281111 A1 | 10/2013 | Syrjarinne et al. |
| 2014/0171098 A1* | 6/2014 | Marti ................ G01S 5/0252 |
| | | 455/456.1 |
| 2014/0179341 A1 | 6/2014 | Sydir et al. |
| 2014/0194138 A1 | 7/2014 | Amizur et al. |
| 2014/0213299 A1 | 7/2014 | Marti et al. |
| 2014/0236475 A1 | 8/2014 | Venkatraman et al. |
| 2014/0303925 A1 | 10/2014 | Milota |
| 2015/0061938 A1 | 3/2015 | Moraleda et al. |
| 2015/0351084 A1 | 12/2015 | Werb |
| 2016/0094941 A1 | 3/2016 | Shen et al. |

OTHER PUBLICATIONS

PCT Search Report and Written Opinion mailed Dec. 23, 2015 for PCT application No. PCT/US15/51871, 9 pages.

\* cited by examiner

POSITIONING MOBILE TERMINAL BASED ON ELECTROMAGNETIC SIGNALS

CROSS-REFERENCE TO RELATED APPLICATIONS

This application is a continuation application of and claims priority to U.S. patent application Ser. No. 14/863,877, filed on 24 Sep. 2015, now pending, which claims foreign priority to Chinese Patent Application No. 201410500056.3 filed on 25 Sep. 2014, entitled "Method and Apparatus for Positioning a Mobile Terminal Based on Electromagnetic Signal," all of which are hereby incorporated by reference in their entirety.

TECHNICAL FIELD

The present disclosure relates to the field of communications, and, more particularly, to a mobile terminal positioning technology based on electromagnetic signals.

BACKGROUND

The rapid development and popularization of smart mobile devices has hastened the emergence and development of indoor (or locally regional) positioning techniques, which mainly adopt integration of various techniques such as wireless communication, base station positioning and inertial navigation positioning to form a set of indoor position positioning systems, so as to realize position monitoring of personnel, objects, and the like in indoor spaces. There is wide demand and application of indoor position techniques in many fields such as commercial applications, public security and military scenarios.

Indoor positioning is usually realized by adopting a triangular positioning method based on (Received Signal Strength Indication (RSSI) and a fingerprint method. Since RSSI is influenced by a multipath effect due to various factors of environments, the error rate of RSSI is great. As a result, the triangular positioning method based on RSSI is gradually being replaced by the fingerprint method. The fingerprint method comprises two steps, wherein the first step is fingerprint database drawing and the second step is real-time positioning. The so-called fingerprint database drawing refers to drawing a "signal field strength map" (fingerprint database) by extracting signal features (Bluetooth RSSI) in an area in which indoor positioning needs to be performed. At the stage of real-time positioning, a user compares a received signal with signals in the "signal field strength map" and the position of the user based on universal algorithms such as a particle filtering algorithm to match a user's position. When the fingerprint database is drawn, the longer the signal acquisition time is and the more the sampling points are, the more accurate the fingerprint database is, the more the positioning accuracy is improved; however, the time costs and other expenses are higher at the same time.

At the stage of real-time positioning, most positioning methods based on the particle filtering algorithm adopt acceleration sensors, gyroscopes and the like in a mobile terminal to measure step number and moving directions, and adopt empirical values of step length to compute position changes of the mobile terminals. Consequently, methods for positioning by adopting empirical values of step length easily cause great position update errors due to the fact that users are different and the specific environments are different.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The purpose of the present disclosure is to provide a mobile terminal positioning method and device based on electromagnetic signals, such that a moving step length closest to the actual step length of a person to be positioned may be obtained in a positioning process and the moving step length may be updated in time with a change of the step length of the person to be positioned.

In order to solve the above-mentioned technical problem, the present disclosure discloses an example mobile terminal positioning method based on electromagnetic signals, which may include the following operations:

matching a signal fingerprint of an electromagnetic signal received by a mobile terminal with signal fingerprints in a pre-generated signal fingerprint map at an initial positioning moment, generating an initial particle set according to a matching result, and randomly allocating different moving step lengths for each particle in the initial particle set; and repetitively executing the following operations:

updating position information of each particle in a particle set at a previous moment to obtain a current particle set according to a moving step number and a moving direction, which are detected by the mobile terminal at a current moment, and a moving step length of each particle:

rating usability of each particle according to position information of each particle in the current particle set and a signal fingerprint received at the current moment;

acquiring a moving step length of each particle having a rating higher than a first rating threshold in the current particle set; and updating a moving step length of each particle having a rating lower than the first rating threshold according to the acquired moving step length.

The present disclosure further discloses a mobile terminal positioning device based on electromagnetic signals, which may include the following units:

a particle initialization unit that matches a signal fingerprint of an electromagnetic signal received by a mobile terminal with signal fingerprints in a pre-generated signal fingerprint map at an initial positioning moment, generates an initial particle set according to a matching result, and randomly allocates different moving step lengths for each particle in the initial particle set;

a particle updating unit that updates position information of each particle in a particle set at a previous moment to obtain a current particle set according to a moving step number and a moving direction, which are detected by the mobile terminal at a current moment, and a moving step length of each particle:

a particle rating unit that rates usability of each particle according to position information of each particle in the current particle set and a signal fingerprint received at the current moment;

a step length acquisition unit that acquires a moving step length of each particle having a rating rated by the particle rating unit that is higher than a first rating threshold in the current particle set;

a step length updating unit that updates a moving step length of each particle having a rating lower than the first rating threshold according to the moving step length acquired by the step length acquisition unit; and an update control unit that controls the particle updating unit, the particle rating unit, the step length acquisition unit and the step length updating unit to repetitively execute corresponding functions to complete the update of the moving step lengths of the particles in the current particle set.

Compared with the conventional techniques, the techniques of the present disclosure mainly have the following differences and technical effects.

The techniques of the present disclosure assign random moving step lengths to particles at the initial positioning stage, then remove the moving step lengths of the particles with low usability ratings and reserve the moving step length of the particles with high usability ratings in the positioning process, such that a moving step length closest to the actual step length of a person to be positioned is obtained in the positioning process and the moving step length is updated in time with the change of the step length of the person to be positioned.

Further, rasterized query is performed, such that comparative query does not need to be performed with respect to each particle and all signal fingerprints in the fingerprint map, and thus the computation load is greatly reduced and the positioning efficiency is improved.

Further, an aggregation degree of the ratings of the particles of the current particle set is computed. If the aggregation degree of the ratings of the particles is too low, it indicates that the positioning fails, the initialization needs to be performed again to generate the initial particle set and then the update of the moving step length and the positioning of the position of the mobile terminal are performed. Thus, that unnecessary computation load is avoided and the positioning efficiency is improved.

Further, when the rating aggregation degree of the particles in the current particle set is lower but does not reach the extent of positioning failure, the current particle set may be updated and the particles with low ratings are deleted and new particles are generated according to the particles with high ratings, such that the rating aggregation degree of the entire current particle set is improved and the accuracy of positioning and step length update is improved.

Further, all Bluetooth beacon devices are creatively set to have the same MAC address, and these Bluetooth beacon devices are viewed as the same device according to the international standard of Bluetooth. MAC addresses of other normal Bluetooth devices are different from that of these Bluetooth beacon devices, such that the interference of other Bluetooth devices is effectively eliminated through recognition of MAC addresses, vicious Bluetooth devices are prevented from disguising to have the same beacon identification and accurate positioning is realized.

DETAILED DESCRIPTION

In the following description, in order to enable readers to better understand the present disclosure, a lot of technical details are provided.

In order to illustrate the purposes, technical solutions and advantages of the present disclosure, the example embodiments of the present disclosure will be further described below in detail in combination with the drawings.

Figure 1:
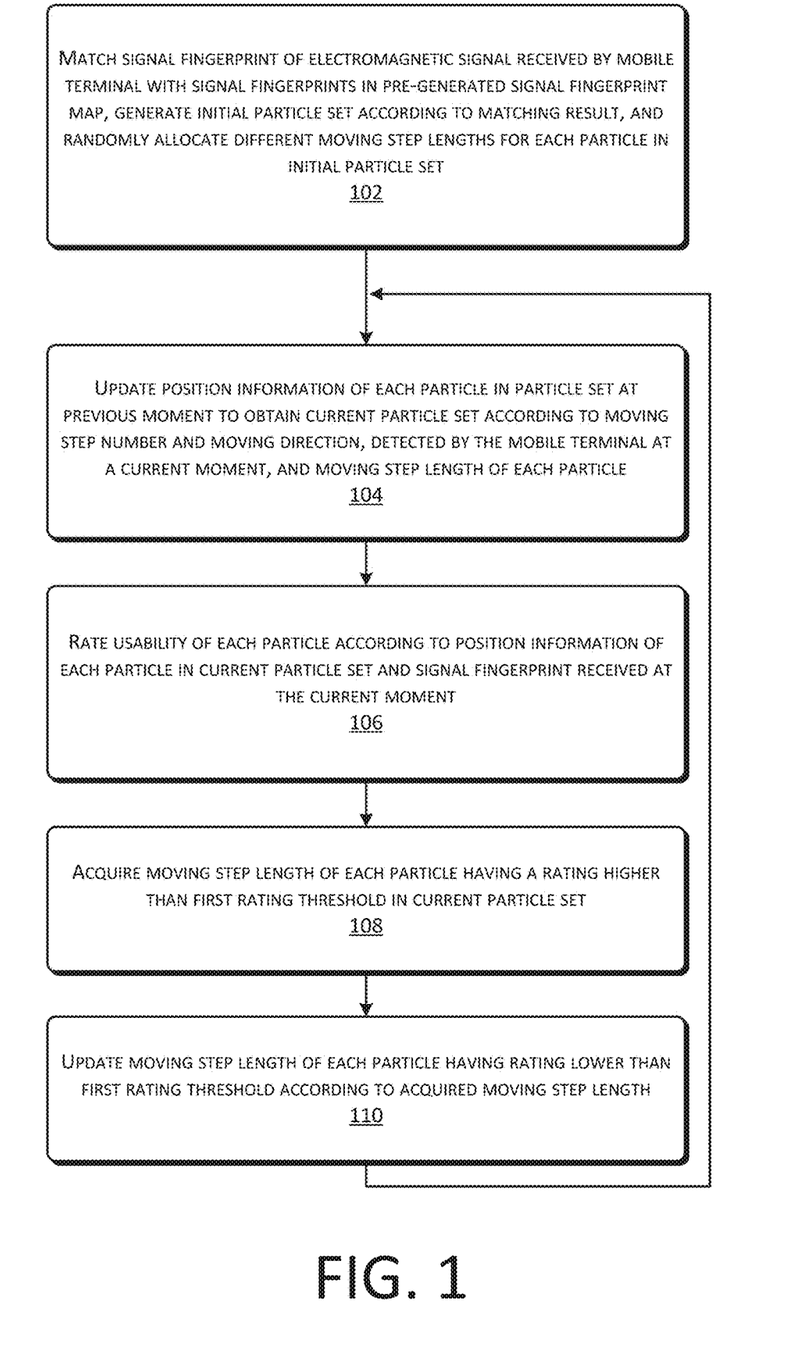
FIG. 1 is a flowchart of an example mobile terminal positioning method based on electromagnetic signals according to the present disclosure.

A first example embodiment of the present disclosure relates to a mobile terminal positioning method based on electromagnetic signals. FIG. 1 is a flowchart of an example mobile terminal positioning method based on electromagnetic signals.

As shown in FIG. 1, the mobile terminal positioning method based on electromagnetic signals may include the following operations:

At an initial positioning moment, operations at 102 are performed. A signal fingerprint of an electromagnetic signal received by a mobile terminal is matched with signal fingerprints in a pre-generated signal fingerprint map. An initial particle set according to a matching result is generated, and different moving step lengths for each particle in the initial particle set are randomly allocated.

It may be understood that each particle in the present disclosure is an object or a data structure, which includes information such as position, direction and step length of a mobile terminal and represents a possibility or candidate of the information such as the position, direction and step length of the mobile terminal.

In a positioning process, operations from 104 to 110 are repetitively performed as follows until the positioning is ended:

At 104, position information of each particle in a particle set at a previous moment is updated to obtain a current particle set according to a moving step number and a moving direction, detected by the mobile terminal at a current moment, and a moving step length of each particle.

At 106, usability of each particle is rated according to position information of each particle in the current particle set and a signal fingerprint received at the current moment.

In the present disclosure, the higher the rating of the particle is, the higher the usability of the particle is, the closer between a moving trajectory of the particle in the positioning process and a moving trajectory of an object to be positioned is, and a survival time of the particle is longer:

Thereafter, at 108, a moving step length of each particle having a rating higher than a first rating threshold in the current particle set is acquired.

It may be understood that, in the present disclosure, the first predetermined threshold may be determined according to specific rating methods and application scenarios. With respect to each particle with a rating equal to the first predetermined threshold in the current particle set, there are various treatment methods as follows: the particle may be used with high-rating particles (i.e., each particle having a rating higher than the first predetermined threshold) for updating the moving step lengths of low-rating particles (i.e., each particle having a rating lower than the first predetermined threshold), used with low-rating particles as updated objects for updating the moving step lengths according to the high-rating particles, or treated as a particle of which the moving step length is not updated and is not used as a basis for updating the moving step lengths of other particles.

Thereafter, at 110, a moving step length of each particle having a rating lower than the first rating threshold is updated according to the acquired moving step length. For example, an average value of moving step lengths of all particles having ratings higher than the first rating threshold is computed, then a random value is added on the basis of the average value and the total value is allocated to each particle having a rating lower than the first rating threshold. Alternatively, a median or a weighted average of the moving step lengths of all particles having ratings higher than the first rating threshold is computed and allocated to each particle having a rating lower than the first rating threshold. The above-mentioned average value, the median or the weighted average may be added with a random value, or without the random value and be directly used as the moving step length of each particle having a rating lower than the first rating threshold.

Thereafter, at a next moment, operations return to 104.

In addition, before the above-mentioned 102, the method may further include the following operations:

Signal fingerprints are sampled in advance at a plurality of preset sampling points in an area which needs to be positioned, and the signal fingerprints obtained after sampling and corresponding position information are saved in the signal fingerprint map. The signal fingerprints include strength of signals which are received at the sampling points and transmitted by at least one signal source. The signal fingerprints may only include signal strength or further include other information. For example, when wireless transmitting equipment is used as a reference object for positioning, the signal fingerprints further include identification information of the wireless transmitting equipment used for transmitting corresponding signal, such as MAC addresses of Bluetooth beacon devices or wireless access points.

In addition, after the above-mentioned 104, the method may further include the following operations:

A position of the mobile terminal is determined according to the position information of each particle in the current particle set.

For example, an average position of the particles in the current particle set is computed and the average position is used as the position of the mobile terminal; or particles with high usability ratings are selected, an average position of the selected particles is computed and the average position is used as the position of the mobile terminal, etc.

It may be understood that, in another example embodiment of the present disclosure, a positioning result is determined according to different frequencies of updating the moving step lengths of the particles, i.e., the position of the mobile terminal is determined according to the position information of the particles in the current particle set in a certain specific cycle which is different from the step length updating cycle, and the positioning result of the mobile terminal may be output in response to a command of the user.

In addition, in this example embodiment, the above-mentioned 106 may further include the following sub-operations:

Position information and signal strength of a signal fingerprint closest to the particle in the signal fingerprint map are acquired.

The usability of the particle is rated according to the signal fingerprint acquired at the current moment and the acquired position information and signal strength.

For example, in an example embodiment of the present disclosure, the rating is determined according to a distance between the particle and the signal fingerprint closest to the particle in the signal fingerprint map and a strength difference between the signal fingerprint and the signal fingerprint acquired at the current moment. In the example embodiment, the shorter the distance between the particle and the signal fingerprint closest to the particle in the signal fingerprint map is and the smaller the strength difference between the signal fingerprint acquired at the current moment and the signal fingerprint closest to the particle in the signal fingerprint map is, the higher the rating of the particle is. Alternatively, the rating is determined according to the distance between the particle and the signal fingerprint or according to the strength difference between the signal fingerprint closet to the particle and the signal fingerprint acquired at the current moment.

In an example embodiment of the present disclosure, the entire signal fingerprint map is rasterized in advance, and a corresponding relationship between each raster and an identification of a signal fingerprint closest to each raster is stored. Accordingly, the sub-operation of acquiring the position information and signal strength of the signal fingerprint closest to the particle in the signal fingerprint map is implemented as follows.

An identification of a signal fingerprint closest to a raster in which the particle is located is queried from the signal fingerprint map according to the corresponding relationship, and the position information and signal strength of the signal fingerprint closest to the particle is acquired according to the queried identification.

Rasterized query is performed, such that comparative query does not need to be performed to each particle and all signal fingerprints in the fingerprint map. Thus, the computation load is greatly reduced and the positioning efficiency is improved.

In addition, in other embodiments of the present disclosure, the usability of the particle can also be rated according to other information. For example, rating can be performed by computing the distance that the particle leaves the average position of all particles, or the usability of the particle is rated by judging whether the particle falls into or penetrates through an unreachable area (such as through a wall or in a wall).

In addition, in the present disclosure, the moving step number may be detected through an accelerometer of the mobile terminal, and the moving direction may be detected through a gyroscope of the mobile terminal. The detection of the moving step number and the moving direction may also be performed by using other equipment. The mobile terminal may be mobile phones, portable notebook computers, tablet computers, etc.

Figure 2:
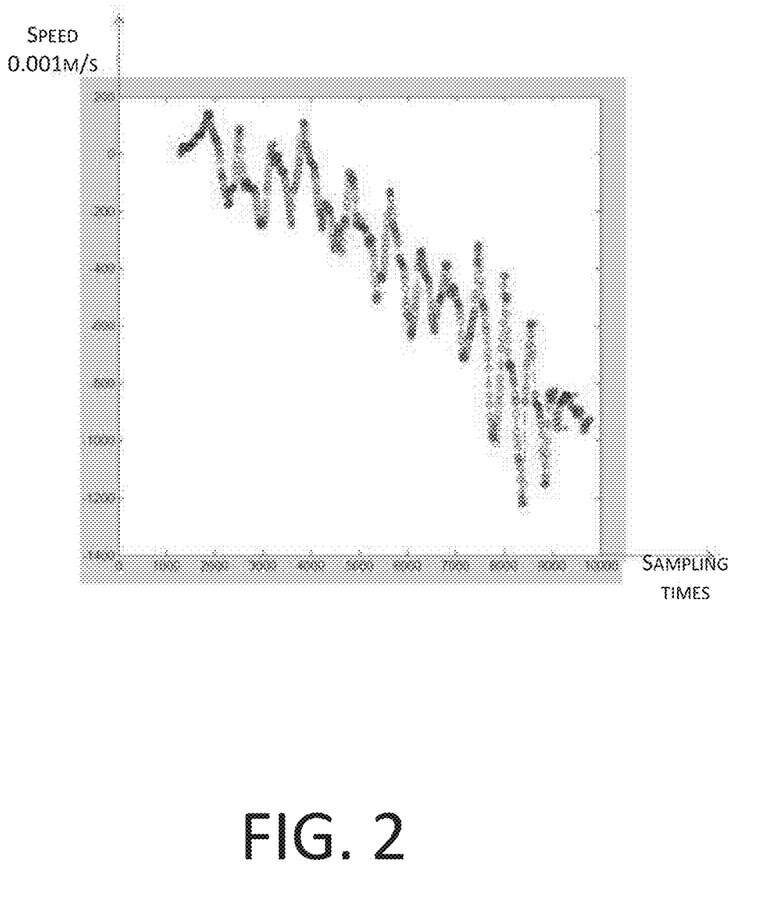
FIG. 2 is a diagram of detecting step number through an example method of detecting wave peaks and valleys of speed according to the present disclosure.

For example, in a mobile terminal such as a mobile phone or a tablet computer with an acceleration sensor, a magnetic sensor or a gyroscope, integration is performed once after removing gravity acceleration from acceleration detected by the acceleration sensor to obtain speed, and the step number is detected by adopting a method of detecting wave peaks and valleys of the speed, as shown in FIG. 2. Since acceleration totally has three axes, average acceleration is $\Delta a = (a_{pitch} + a_{roll} + a_{yaw})/3$, the speed S is obtained by integration of the average acceleration through a formula S=ΣΔa*Δt. As shown in FIG. 2, the fluctuation of the average speed may be observed (sampling frequency: 10 Hz). The wave peaks and valleys are detected by adopting a dynamic threshold method, and then the step number is computed according to the number of the wave peaks and valleys. In order to prevent from adding interference, three example methods may be used. A first method is to set an upper limit and a lower limit for speed difference and the detection is considered to be valid only when the speed difference is within the range between the upper limit and the lower limit; a second method is to constrain a time interval between the wave peaks and valleys, usually the minimum step interval of human during both walking and running is 200 milliseconds and the maximum step interval is 2000 milliseconds, and thus too short or too long step lengths are filtered by using this parameter; and a third method is to distinguish a valid step from an invalid step by adopting a statistic method. Since walking is a continuous process, when steps are detected, the former steps are checked. If there are three or more continuous steps, the steps are considered to be valid steps.

The magnetic sensor of each mobile phone has a certain zero offset, the zero position of the magnetic sensor is easily interfered by substances with a magnetic field, and thus the computed value in the context is a relative displacement value.

$$x_{n+1} = x_n + \Delta stepNum_n * stepLen * \cos(\Delta\theta_n)$$

$$y_{n+1} = y_n + \Delta stepNum_n * stepLen * \sin(\Delta\theta_n)$$

$$\Delta\theta_n = \theta_n - \theta_0$$

wherein, $x_n$ and $y_n$ represent relative displacement of $n^{th}$ step of the user. $\Delta stepNum_n$ represents step number, steplen represents step length, $\theta_0$ represents zero offset angle of magnetic sensor, and $\theta_n$ represents offset angle of $n^{th}$ step of user detected by magnetic sensor.

In addition, it may be understood that, in the present disclosure, the device used as positioning references may be various devices capable of transmitting wireless signals, such as Bluetooth devices and wireless access points, and may also be differently distributed magnetic fields which are formed by a geomagnetic field in different spaces, etc.

In the present disclosure, random moving step lengths are given to particles at the initial positioning stage, then the moving step lengths of the particles with low usability ratings are abandoned and the moving step length of the particles with high usability ratings are reserved in the positioning process, such that a moving step length closest to the actual step length of a person to be positioned is obtained in the positioning process and the moving step length is updated in time with the change of the step length of the person to be positioned.

A second example embodiment of the present disclosure relates to a mobile terminal positioning method based on electromagnetic signals.

The second example embodiment is improved on the basis of the first example embodiment. One of the improvements is that an aggregation degree of the ratings of the particles of the current particle set is calculated; and if the aggregation degree of the ratings of the particles is too low, it indicates that the positioning fails and initialization needs to be performed again to generate the initial particle set and then the update of the moving step length and the positioning of the position of the mobile terminal are performed. Thus unnecessary computation load is avoided and the positioning efficiency is improved.

Figure 3:
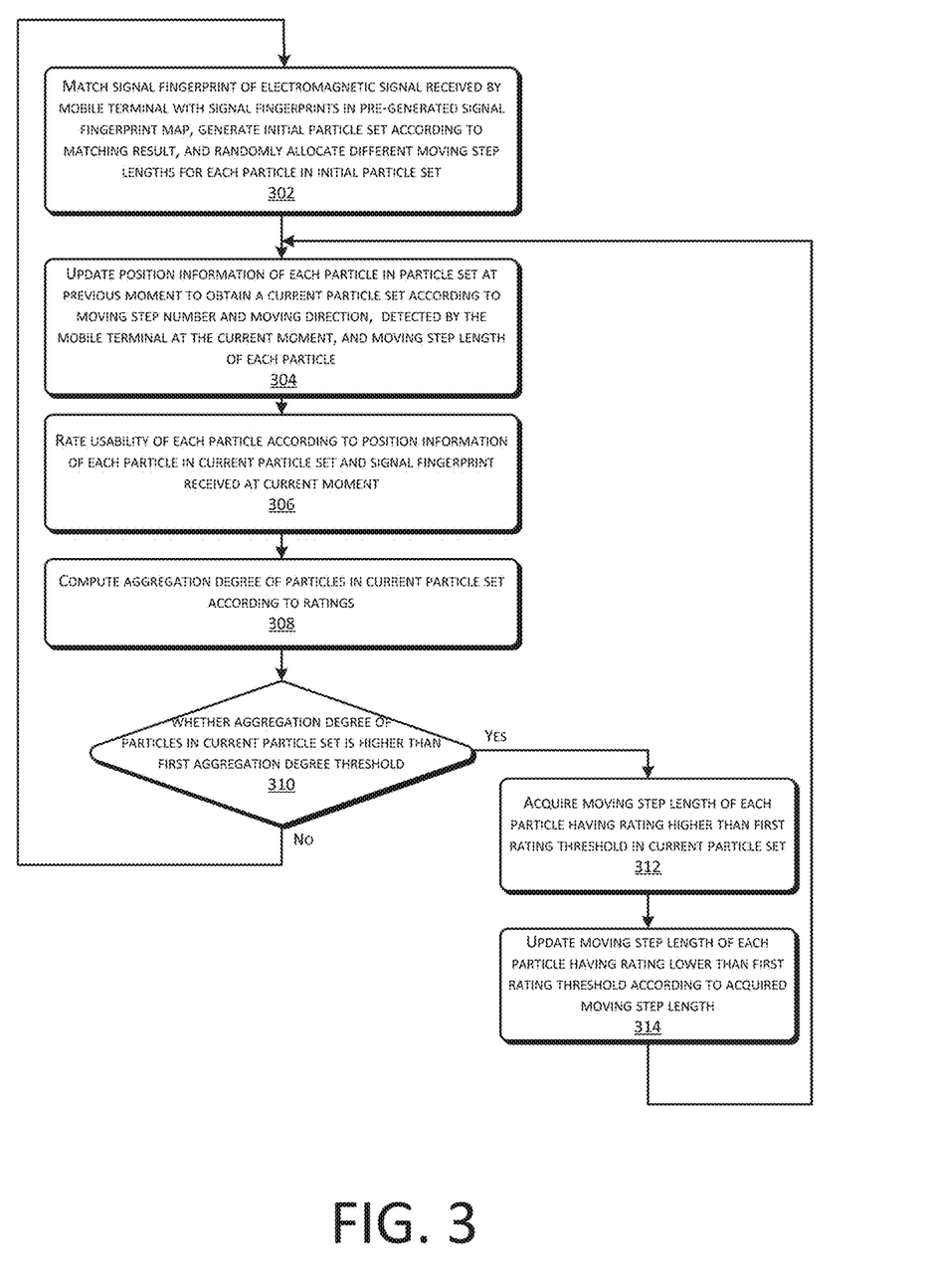
FIG. 3 is a flowchart of an example mobile terminal positioning method based on electromagnetic signals according to the present disclosure.

As shown in FIG. 3, the example positioning method may include the following operations:

At an initial positioning moment, operations at 302 are performed. A signal fingerprint of an electromagnetic signal received by a mobile terminal is matched with signal fingerprints in a pre-generated signal fingerprint map, an initial particle set is generated according to a matching result, and different moving step lengths for each particle in the initial particle set are randomly allocated.

In a positioning process at a current moment, operations at 304 are performed. Position information of each particle in a particle set at a previous moment is updated to obtain a current particle set according to a moving step number and a moving direction, which are detected by the mobile terminal at the current moment, and a moving step length of each particle.

Thereafter, operations at 306 are performed. Usability of each particle is rated according to position information of each particle in the current particle set and a signal fingerprint received at the current moment.

Thereafter, at 308, an aggregation degree of the particles in the current particle set is computed according to the ratings.

Thereafter, at 310, whether the aggregation degree of the particles in the current particle set is higher than a first aggregation degree threshold is determined. If a determining result is yes, operations at 312 and 314 are performed; otherwise, as it indicates that the aggregation degree of the ratings of the particles in the current particle set is too low and the positioning fails, operations at 302 of acquiring particles are restarted to obtain an initial particle set at a next moment and moving step lengths of particles in the initial particle set.

At 312, a moving step length of each particle having a rating higher than a first rating threshold in the current particle set is acquired.

Thereafter, at 314, a moving step length of each particle having a rating lower than the first rating threshold is updated according to the acquired moving step length.

Thereafter, operations return to 304 to execute a positioning process of a next moment.

A third example embodiment of the present disclosure relates to a mobile terminal positioning method based on electromagnetic signals.

The third example embodiment is improved on the basis of the second example embodiment. One of the improvements is that, when the rating aggregation degree of the particles in the current particle set is lower but does not reach the extent of positioning failure, the current particle set is updated and the particles with low ratings are deleted and new particles are generated according to the particles with high ratings, such that the rating aggregation degree of the entire current particle set is improved and the accuracy of positioning and step length update is improved.

For example, the positioning method in this example embodiment may further include the following operations:

If the determining result in the above-mentioned 310 is yes, whether the aggregation degree of the particles in the current particle set is lower than a second aggregation degree threshold is determined, wherein the second aggregation degree threshold is greater than the first aggregation degree threshold.

If the above-mentioned judgment result is yes, the particles having ratings lower than the second rating threshold in the current particle set is deleted.

Particles having ratings higher than the second rating threshold are generated and a number of the generated particulars is equal to the number of the deleted particles according to position information of remaining particles in the current particle set after deletion to form an updated current particle set.

A position of the mobile terminal is determined according to the positions of the particles in the updated current particle set. The above-mentioned 312 and 314 are performed.

In addition, the second rating threshold may be the same as the first rating threshold, or different from the first rating threshold.

In addition, in another example embodiment of the present disclosure, a positioning result is output, i.e., the position of the mobile terminal is determined, after the above-mentioned determination that the aggregation degree of the particles in the current particle set is higher than the first aggregation degree threshold.

A fourth example embodiment of the present disclosure relates to a mobile terminal positioning method based on Bluetooth signals. For example, the method may include the following operations:

(1) Generation of Fingerprint Map

At least two Bluetooth beacon devices are pre-arranged in an area which needs to be positioned, and then a Bluetooth fingerprint map is generated by adopting a sampling point method or a straight line method.

1) Sampling Point Method:

A user holds a mobile terminal and walks in the area which needs to be positioned. A current position of the mobile terminal is set and Bluetooth fingerprints <$ID_1$: $RSSI_1$, $ID_2$: $RSSI_2$, ..., $ID_n$: $RSSI_n$, ..., Position> of the current position are collected. The Bluetooth fingerprints of a plurality of positions are recorded to form a Bluetooth fingerprint map, wherein $ID_n$ is an identification of nth Bluetooth beacon device which transmits Bluetooth signals at a particular current position, $RSSI_n$ expresses strength of Bluetooth signals transmitted by the Bluetooth beacon device, and Position is position information of the current position.

2) Straight Line Method:

A user holds a mobile terminal and walks in an area which needs to be positioned. A current position in the mobile terminal is set and the user walks for a certain distance at constant speed along a straight line, stops and sets a stopping point position in a mobile phone. During moving of the mobile phone, the mobile phone recording Bluetooth fingerprints through an average interval method and assigns an actual position to each fingerprint by using a difference value method; records the Bluetooth fingerprints sampled in the entire process; and finally uses special fingerprint map synthesis software to enable all data to form an integral Bluetooth fingerprint map, wherein the software may selectively delete or move certain fingerprint points.

(2) Particle Filtering Integrated Navigation

Particle filtering refers to a process of approximately expressing a probability density function by searching a group of random samples which are spread in a state space, using an average value of the samples to replace integral operation and further obtaining the minimum variance estimate of a system state. These samples are vividly called as "particles", and hence it is called particle filtering. The probability distribution of the particles in particle filtering is a kind of real approximation. Compared with Kalman filtering, the particle filtering has better adaptability in non-linear and non-Gaussian systems.

Particle filtering integrated navigation in this example embodiment includes the following operations:

1) Particle initialization, i.e., matching a Bluetooth fingerprint received by a mobile terminal with Bluetooth fingerprints in a pre-generated Bluetooth fingerprint map, generating an initial particle set according to a matching result, and randomly allocating different moving step lengths for each particle in the initial particle set. For example, a specific realization is as follows:

Global fingerprint matching is adopted, i.e., the current Bluetooth fingerprint is compared with the Bluetooth fingerprints in the Bluetooth fingerprint map, and scored:

$$S = \sum_{i=1}^{m} (\vec{r} - \vec{r_n'})^2$$

wherein, $\vec{r}$ is strength vector of real-time Bluetooth fingerprint (i.e., including Bluetooth signal strength and an identification of a Bluetooth beacon device which transmits Bluetooth signals), $\vec{r_n'}$ is strength vector of Bluetooth fingerprint in Bluetooth fingerprint database, and m is the number of matched Bluetooth fingerprints. Then, Bluetooth fingerprints of the top P % are taken out according to scores of S. The lower the matching scores of the Bluetooth fingerprint is, the larger the probability of generating particles is. Each particle has the following attributes:

$X_1 = X_0 + \text{Gauss}(0, d_x)$, $Y_1 = Y_0 + \text{Gauss}(0, d_y)$, zero_angle=random(0,360), step_size=step_size×(1+random($-d_s, d_s$)), wherein $X_1$ is x coordinate of initial position of a particle and $Y_1$ is y coordinate of initial position of the particle; zero_angle is zero offset angle of current magnetic sensor; step_size is moving step length of particle; $X_0$ and $Y_0$ are horizontal and vertical coordinates of positions of matched Bluetooth fingerprints in corresponding fingerprint map; Gauss is Gaussian function, wherein the first parameter 0 is an average value, the second parameter $d_x$ or $d_y$ is a variance; random is random function, wherein the first parameter is a lower limit and the second parameter is an upper limit; and $d_x$ and $d_y$ are respectively variances of displacement x and y, and $d_s$ is random proportion coefficient of step length.

2) Particle updating, i.e., updating position information of each particle in a particle set at a previous moment to obtain a current particle set according to a moving step number and a moving direction, which are detected by the mobile terminal at a current moment, and a moving step length of each particle. An example implementation is as follows:

The acceleration sensor and the magnetic sensor of the mobile terminal detect a step number difference and a moving direction. The position information of the particle after $n^{th}$ update is computed through the following formula:

$X_{n+1} = X_n + (\cos(\theta_n + \text{zero\_angle}_n) + \text{Gauss}(0, D_{ex})) * \text{step\_size} * \Delta\text{step\_num} + \text{Gauss}(0, D_{ax})$ $Y_{n+1} = Y_n + (\sin(\text{angle}_n + \text{zero\_angle}_n) + \text{Gauss}(0, D_{ey})) * \text{step\_size} * \Delta\text{step\_num} + \text{Gauss}(0, D_{ay})$ $\text{zero\_angle}_{n+1} = \text{zero\_angle}_n + (\text{angle}_n - \text{angle}_{n-1}) * \text{Gauss}(0, A_e) + \text{Gauss}(0, A_a)$ wherein, $X_n$ expresses horizontal coordinate of particle after (n−1)th update, $Y_n$ expresses vertical coordinate of particle after (n−1)th update, step_size expresses moving step length of the particle, zero_angle$_n$ expresses magnetic offset of particle after (n−1)th update, angle$_n$ expresses absolute degree of magnetic sensor at current moment, angle$_{n-1}$ expresses absolute angle of magnetic sensor during (n−1)th update of particle, D$_{ex}$ expresses static deviation of horizontal coordinate of displacement, D$_{ax}$ expresses random deviation of vertical coordinate of displacement, D$_{ey}$ expresses static deviation of vertical coordinate of displacement. D$_{ay}$ expresses random deviation of vertical coordinate of displacement, A$_e$ expresses static deviation of zero angle, A$_a$ expresses random deviation of zero angle, and Gauss is a Gaussian function, wherein the first parameter is an average value and the second parameter is a variance.

Simultaneously, the strength of the Bluetooth signal received by the mobile terminal at the current moment is used as the current Bluetooth signal strength of the particle, i.e., the Bluetooth fingerprint detected at the current moment is assigned to the Bluetooth fingerprint corresponding to the particle.

3) Particle rating, i.e., rating usability of each particle according to position information of each particle in the current particle set and a signal fingerprint received at the current moment.

For example, the particle rating may be implemented as follows:

After the particles are updated, each particle is rated. If, in the Bluetooth fingerprint map, a Bluetooth fingerprint having the closest Euclidean distance to a particle $P(X_{p_n}, Y_{p_n}, \vec{F}_{p_n})$ at the current moment is $F(X_{f_n}, Y_{f_n}, \vec{F}_{f_n})$, the rating W of the particle is:

$$W = 1/e^{D/K_1^{2*}} (1/e^{R^2/K_2^2})$$

wherein, $D = |\vec{F}_{p_n} - \vec{F}_{f_n}|$, $R = \sqrt{((X_{p_n} - X_{f_n})^2 + (Y_{p_n} - Y_{f_n})^2)}$, $\vec{F}_{p_n}$ expresses Bluetooth fingerprint strength vector corresponding to particle $P(X_{p_n}, Y_{p_n}, \vec{F}_{p_n})$ at current moment, i.e., Bluetooth fingerprint collected at current moment (including each Bluetooth signal and an identification of the device which transmits each Bluetooth signal), $\vec{F}_{f_n}$ expresses Bluetooth fingerprint strength vector of Bluetooth fingerprint $F(X_{f_n}, Y_{f_n}, \vec{F}_{f_n}, xp_n)$, and $Y_{p_n}$ express horizontal and vertical coordinates of particle $P(X_{p_n}, Y_{p_n}, \vec{F}_{p_n})$ at current moment, $X_{f_n}$ and $Y_{f_n}$ express horizontal and vertical coordinates of Bluetooth fingerprint $F(X_{f_n}, Y_{f_n}, \vec{F}_{f_n})$, and $K_1$ and $K_2$ are corresponding fixed parameters.

For another example, the particle rating may be implemented as follows:

Rating is performed by using a relative value, i.e., rating is performed by using a relative amount of fingerprint change. For example, with respect to a particular particle, the strength of a Bluetooth signal transmitted by a Bluetooth beacon device with an identification which is the same as that of a Bluetooth fingerprint having the closest Euclidean distance to the particular particle at the current moment is −90 dB and the strength at a next moment is −80 dB. With respect to a Bluetooth fingerprint received by the mobile device, the strength of a Bluetooth signal transmitted by a Bluetooth beacon device with the same identification at the current moment is −80 and the strength at a next moment is −70 dB. Although the absolute values of the strength of the two are different at the same moment, the relative values at the previous and later moments are 10 dB in difference, the matching degree of the Bluetooth fingerprints is considered 100% at this moment. Certainly, the rating of fingerprint distance is not changed. This rating has the advantage that it adapts to the problem that RSSI scanned by various mobile devices to the same Bluetooth beacon is inconsistent. If, in the Bluetooth fingerprint map, a Bluetooth fingerprint having the closest Euclidean distance to particle $P(X_{p_n}, Y_{p_n}, \vec{F}_{p_n})$ is $F(X_{f_n}, Y_{f_n}, \vec{F}_{f_n})$, the rating W of the particle is:

$$W = 1/e^{D/K_1^2} * (1/e^{R^2/K_2^2})$$

wherein, $D = |\Delta F_{p_n} - \Delta F_{f_n}|$, $R = \sqrt{((X_{p_n} - X_{f_n})^2 + (Y_{p_n} - Y_{f_n})^2)}$, $\Delta F_{p_n} = F_{p_n} - F_{p_{n-1}}$, $\Delta F_{f_n} = F_{f_n} - F_{f_{n-1}}$, $\vec{F}_{p_n}$ expresses Bluetooth fingerprint strength vector corresponding to particle $P(X_{p_n}, Y_{p_n}, \vec{F}_{p_n})$ at current moment, i.e., Bluetooth fingerprint collected at current moment (including each Bluetooth signal and an identification of equipment which transmits each Bluetooth signal), $\vec{F}_{f_n}$ expresses Bluetooth fingerprint strength vector of Bluetooth fingerprint $F(X_{f_n}, Y_{f_n}, \vec{F}_{f_n})$, $X_{p_n}$ and $Y_{p_n}$ express horizontal and vertical coordinates of particle $P(X_{p_n}, Y_{p_n}, \vec{F}_{p_n})$ at current moment, $X_{f_n}$ and $Y_{f_n}$ express horizontal and vertical coordinates of Bluetooth fingerprint $F(X_{f_n}, Y_{f_n}, \vec{F}_{f_n})$, $F_{p_{n-1}}$ expresses strength vector of Bluetooth fingerprint corresponding to particle $P(X_{p_n}, Y_{p_n}, \vec{F}_{p_n})$ at previous moment. $F_{f_{n-1}}$ expresses strength vector of Bluetooth fingerprint having the closest Euclidean distance to the particle at previous moment, and $K_1$ and $K_2$ are corresponding fixed parameters.

4) Particle re-sampling, i.e., if the rating aggregation degree of the particles in the current particle set is lower than a second aggregation degree threshold and higher than a first aggregation degree threshold, deleting the particles having ratings lower than the second rating threshold in the current particle set; and generating particles having ratings higher than the second rating threshold, a number of the generated particles equal to the number of the deleted particles according to position information of remaining particles in the current particle set after deletion, to form an updated current particle set.

For example, the particle re-sampling may be implemented as follows:

Aggregation degree G of particle is expressed as:

$$G = W_{all}^2 / W_{cor} / m$$

wherein, $W_{all}$ is a sum of ratings of all particles at current moment, i.e., $W_{all} = \sum_{i=1}^{m} W_i$, $W_{cor}$ is square sum of all particle ratings at current moment, i.e., $W_{cor} = \sum_{i=1}^{m} W_i^2$, and m is total number of particles in current particle set.

When $T_1 < G < T_2$, an operation of particle re-sampling is performed, particles having ratings lower than the second rating threshold are deleted, the new particles whose number is the same as that of the deleted particles is generated, and more particle re-sampling is performed to particles having higher weights in the remaining particles at higher probability such that the total number of the particles is not changed, wherein $T_1$ is first aggregation degree threshold and $T_2$ is second aggregation degree threshold.

Then, the moving step lengths of the particles having ratings lower than the first rating threshold in the current particle set after re-sampling are updated according to the moving step lengths of the particles having ratings higher than the first rating threshold in the current particle set after re-sampling.

When weight G is very low, i.e., when $G<T_1$, it is considered that positioning fails and particle initialization needs to be performed again.

In the re-sampling process, the displacement, zero_angle, and step_size of the particles change at certain probability and amplitude.

A final positioning result, i.e., a result of weighted average of position information of all particles having ratings higher than a third rating threshold, is output.

In another embodiment of the present disclosure, other formulas may also be adopted to perform rating to the particles in the particle sets and compute the aggregation degrees thereof.

All operations of positioning based on Bluetooth in this example embodiment are also applicable to positioning based on other electromagnetic signals, such as wireless network signals.

A fifth example embodiment of the present disclosure relates to a mobile terminal positioning method based on electromagnetic signals.

The fifth example embodiment is improved on the basis of the fourth example embodiment. One of the improvements is that: all Bluetooth beacon devices are creatively set to have the same MAC address. These Bluetooth beacon devices are viewed as the same device according to the international standard of Bluetooth and the MAC addresses of other normal Bluetooth devices are different from that of these Bluetooth beacon devices, such that the interferences of other Bluetooth devices are effectively eliminated through recognition of MAC addresses, vicious Bluetooth devices are prevented from disguising to have the same beacon identification and accurate positioning is realized.

For example, in the above-mentioned each positioning operation, Bluetooth fingerprints may be received as follows:

A mobile terminal receives Bluetooth signals transmitted by at least one Bluetooth beacon device, acquires an MAC address of each Bluetooth beacon device according to the received Bluetooth signals, selects all Bluetooth beacon devices with MAC addresses which are the first MAC address as reference devices, and acquires Bluetooth signal strength and a broadcasted beacon identification of each reference device according to the received Bluetooth signal. The Bluetooth signals transmitted by each Bluetooth beacon device are encrypted Bluetooth signals which change with time, and thus the received Bluetooth signals are decrypted to obtain the broadcasted beacon identification of each reference device and further Bluetooth fingerprints are generated.

The embodiments of the present disclosure may be realized by software, hardware, firmware and the like. Regardless whether the present disclosure is realized by software, hardness or firmware, computer-executable instructions may be stored in any type of computer-readable media (such as permanent or rewritable, volatile or nonvolatile, solid state or non-solid state, and fixed or replaceable media, etc.). Similarly, the computer-readable media may be, for example, PAL (Programmable Array Logic) memories, RAMs (Random Access Memories), PROMs (Programmable Read Only Memories), ROMs (Read-Only Memories), EEPROMs (Electrically Erasable Programmable ROMs), magnetic discs, compact discs, DVDs (Digital Versatile Discs), etc. As defined herein, the computer-readable media does not include transitory media such as a modulated data signal and a carrier wave.

Figure 4:
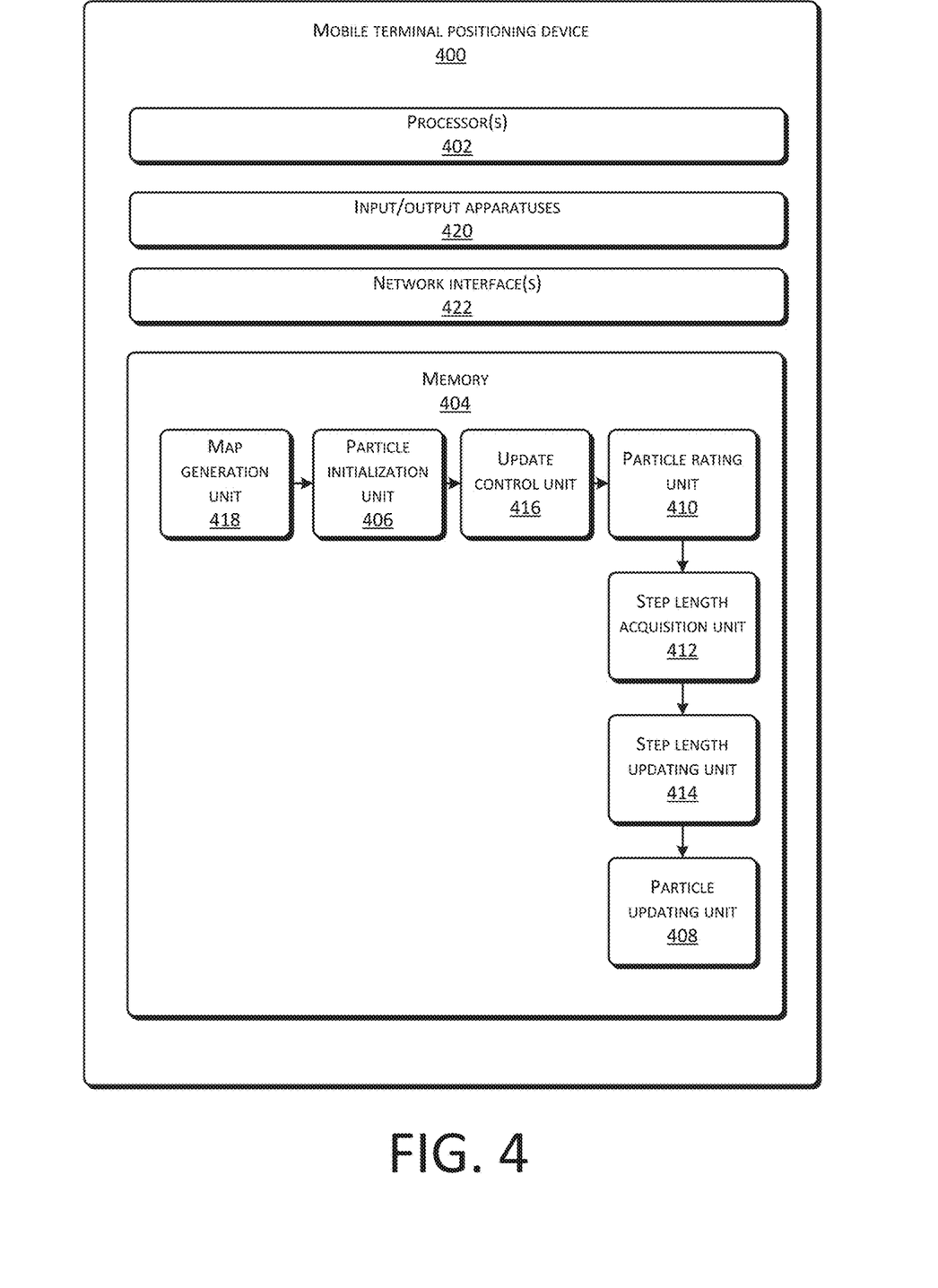
FIG. 4 is a structural diagram of an example mobile terminal positioning device based on electromagnetic signals according to the present disclosure.

A sixth example embodiment of the present disclosure relates to a mobile terminal positioning device based on electromagnetic signals. FIG. 4 is a structural schematic diagram of an example mobile terminal positioning device 400 based on electromagnetic signals. The mobile terminal positioning device 400 may include one or more processor(s) 402 or data processing unit(s) and memory 404. The memory 404 is an example of computer-readable media.

The memory 404 may store therein a plurality of modules or units including:

a particle initialization unit 406 that matches a signal fingerprint of an electromagnetic signal received by a mobile terminal with signal fingerprints in a pre-generated signal fingerprint map at an initial positioning moment, generates an initial particle set according to a matching result, and randomly allocates different moving step lengths for each particle in the initial particle set:

a particle updating unit 408 that updates position information of each particle in a particle set at a previous moment to obtain a current particle set according to a moving step number and a moving direction, which are detected by the mobile terminal at a current moment, and a moving step length of each particle:

a particle rating unit 410 that rates usability of each particle according to position information of each particle in the current particle set and a signal fingerprint received at the current moment;

a step length acquisition unit 412 that acquires a moving step length of each particle having a rating rated by the particle rating unit 410 that is higher than a first rating threshold in the current particle set;

a step length updating unit 414 that updates a moving step length of each particle having a rating lower than the first rating threshold according to the moving step length acquired by the step length acquisition unit 412;

an update control unit 416 that controls the particle updating unit 408, the particle rating unit 410, the step length acquisition unit 412, and the step length updating unit 414 to repetitively execute corresponding functions to complete the update of the moving step lengths of the particles in the current particle set; and a map generation unit 418 that, before the particle initialization unit 406 generates the initial particle set, samples signal fingerprints in advance at a plurality of sampling points in an area which needs to be positioned, and stores the signal fingerprints obtained after sampling and corresponding position information in the signal fingerprint map.

The mobile terminal positioning device 400 may further include one or more input/output apparatuses 420 and network interface(s) 422.

For example, the particle rating unit 410 may include the following subunits (not shown in FIG. 4):

a fingerprint acquisition subunit that acquires position information and signal strength of a signal fingerprint closest to the particle in the signal fingerprint map; and a usability rating subunit that rates the usability of the particle according to the signal fingerprint acquired at the current moment and the acquired position information and signal strength.

In an example embodiment of the present disclosure, the entire signal fingerprint map is rasterized in advance, and a corresponding relationship between each raster and an identification of a signal fingerprint closest to each raster is stored; and the fingerprint acquisition subunit may perform the following operations: querying an identification of a signal fingerprint closest to a raster in which the particle is located from the signal fingerprint map according to the corresponding relationship, and acquiring the position information and signal strength of the signal fingerprint closest to the particle according to the queried identification.

The first example embodiment is a method embodiment corresponding to this example embodiment. This example embodiment may be implemented in cooperation with the first embodiment. Relevant technical details mentioned in the first example embodiment are still effective in this example embodiment. For brevity, repetitive details are not described here. Correspondingly, relevant technical details mentioned in this example embodiment may also be applied to the first example embodiment.

A seventh example embodiment of the present disclosure relates to a mobile terminal positioning device based on electromagnetic signals.

The seventh example embodiment is improved on the basis of the sixth example embodiment. One of the improvements is that the aggregation degree of the ratings of the particles in the current particle set is computed; and if the aggregation degree of the ratings of the particles is too low, it indicates that the positioning fails. The initialization needs to be performed again to generate the initial particle set and then the update of the moving step length and the positioning of the position of the mobile terminal are performed, such that unnecessary computation load is avoided and the positioning efficiency is improved.

For example, the positioning device in this example embodiment may include one or more processor(s) or data processing unit(s) and memory. The positioning device may further include one or more input/output apparatuses and network interfaces. The memory is an example of computer-readable media. In addition to the modules or units in the sixth example embodiment, the memory may store therein a plurality of modules or units including:

an aggregation degree computation unit that computes an aggregation degree of the particles in the current particle set according to the usability ratings of the particles rated by the particle rating unit:

a first aggregation degree determination unit that determines whether the aggregation degree of the particles in the current particle set is higher than a first aggregation degree threshold or not; and a first acquisition control unit that, when the aggregation degree of the particles in the current particle set, determined by the first aggregation degree determination unit, is higher than the first aggregation degree threshold, controls the step length acquisition unit to acquire the moving step length of each particle having a rating higher than the first rating threshold in the current particle set.

The second example embodiment is a method embodiment corresponding to this example embodiment. This example embodiment may be implemented in cooperation with the second example embodiment. Relevant technical details mentioned in the second embodiment are still effective in this example embodiment. For brevity, repetitive details are not described here. Correspondingly, relevant technical details mentioned in this example embodiment may also be applied to the second example embodiment.

An eighth example embodiment of the present disclosure relates to a mobile terminal positioning device based on electromagnetic signals.

The eighth example embodiment is improved on the basis of the seventh example embodiment. One of the improvements is that, when the rating aggregation degree of the particles in the current particle set is low but does not reach the extent of positioning failure, the current particle set is updated and the particles with low ratings are deleted and new particles are generated according to the particles with high ratings, such that the rating aggregation degree of the entire current particle set is improved and the accuracy of positioning and step length update is improved.

For example, the positioning device in this example embodiment may include one or more processor(s) or data processing unit(s) and memory. The positioning device may further include one or more input/output apparatuses and network interfaces. The memory is an example of computer-readable media. In addition to the modules or units in the seventh example embodiment, the memory may store therein a plurality of modules or units including:

a second aggregation degree determination unit that, when the aggregation degree of the particles in the current particle set determined by the first aggregation degree determination unit is higher than the first aggregation degree threshold, determines whether the aggregation degree of the particles in the current particle set is lower than a second aggregation degree threshold or not, wherein the second aggregation degree threshold is greater than the first aggregation degree threshold:

a particle deletion unit that, when the second aggregation degree determination unit determines that the aggregation degree computed by the aggregation degree computation unit is lower than the second aggregation degree threshold and higher than the first aggregation degree threshold, deletes the particles having ratings lower than a second rating threshold in the current particle set;

a particle generation unit that generates particles having ratings higher than the second rating threshold, a number of the generated particles being equal to the number of the deleted particles, according to position information of remaining particles in the current particle set after deletion to form an updated current particle set;

a position output unit that determines the position of the mobile terminal according to the positions of the particles in the current particle set updated by the particle generation unit; and a second acquisition control unit that, after the particle generation unit updates the current particle set, controls the step length acquisition unit to acquire a moving step length of each particle having a rating higher than the first rating threshold in the current particle set.

The third example embodiment is a method embodiment corresponding to this example embodiment. This example embodiment may be implemented in cooperation with the third example embodiment. Relevant technical details mentioned in the third example embodiment are still effective in this embodiment. For brevity, repetitive details are not described here. Correspondingly, relevant technical details mentioned in this example embodiment may also be applied to the third example embodiment.

For example, all units mentioned in each equipment embodiment of the present disclosure are logic units. Physically, a logic unit can be a physical unit, can also be a part of a physical unit, and may also be a combination of a plurality of physical units. The physical implementations of these logic units are not the most important. The combination of functions realized by these logic units is the key to solve the technical problems which are described in the present disclosure. In addition, in order to highlight the innovative part of the present disclosure, units which do not have a close connection with the solution to the technical problems which are described in the present disclosure are not introduced in the above-mentioned example device embodiments of the present disclosure, which does not indicate that other units do not exist in the above-mentioned example device embodiments.

It needs to be stated that, in the claims and description of the present patent, relation terms such as "first" and "second" are just used for distinguishing one entity or operation from another entity or operation, instead of requiring or implying that these entities or operations therebetween have any such actual relation or order. In addition, terms "include", "including", "comprise" and "comprising" or any other variants thereof are intended to cover nonexclusive inclusion, such that processes, methods, commodities or devices including a series of elements not only include these elements, but also include other elements which are not clearly listed, or include intrinsic elements of these processes, methods, commodities or devices. Without more limitation, elements defined by a statement "comprise a . . . " do not exclude additional identical elements existing in the processes, methods, commodities or devices including the described elements.

Although the present disclosure has already been illustrated and described by reference to some example embodiments of the present disclosure, one skilled in the art shall understand that various modifications may be made thereto in forms and details without deviating the spirit and range of the present disclosure.

What is claimed is:

1. A method for determining a step length of an entity associated to a radio frequency (RF) node, comprising:
    receiving a signal propagation parameter of the RF node measured at a first time point;
    determine a set of first position points based on the signal propagation parameter of the RF node measured at the first time point;
    assigning a set of candidate moving step lengths to the first position points;
    receiving a signal propagation parameter of the radio frequency (RF) node measured at a second time point;
    determining a number of steps made by the entity from the first time point to the second time point;
    obtaining a set of second position points based on the first position points, the number of steps and the set of candidate moving step lengths assigned to the first position points; and
    analyzing the second position points based on the signal propagation parameter of the RF node received at the second time point to determine a step length of the entity;
    wherein the analyzing the second position points based on the signal propagation parameter of the RF node received at the second time includes:
    for a second position point, determining a proximate fingerprint of the signal propagation parameter, which is pre-sampled at a sampling point geographically proximate to the second position point;
    ranking the second position point based at least in part on a comparison of the signal propagation parameter of the RF node received at the second time point and the determined proximate fingerprint of the signal propagation parameter; and
    updating the set of candidate moving step lengths based on the ranking.

2. The method of claim 1, wherein the signal propagation parameter of the RF node includes a signal strength associated with the RF node.

3. The method of claim 2, further comprising:
    receiving a fingerprint map of fingerprints of the signal propagation parameter which are pre-sampled at a plurality of sampling points in an area where the RF node is located; and
    using the received fingerprint map in the determining of the first position points.

4. The method of claim 1, further comprising:
    determining an aggregation degree of the second position points based on the ranking of each second position point;
    comparing the determined aggregation degree with an aggregation threshold; and
    in response to the determined aggregation degree does not match the aggregation threshold, deleting a second position point that includes a ranking lower than a ranking threshold from the set of second position points.

5. The method of claim 1, further comprising:
    selecting one or more candidate moving step lengths of one or more second position points each having a ranking higher than a threshold; and
    determining the step length of the entity based on the selected one or more candidate moving step lengths.

6. The method of claim 5, further comprising:
    deleting a second position point that includes a ranking lower than the ranking threshold from the set of second position points; and
    generating a new second position point to replace the deleted second position point, the new second position point being generated based on the selected one or more candidate moving step lengths of the one or more second position points each having a ranking higher than the threshold.

7. The method of claim 1, wherein a position point represents an estimate of at least one of a position and a direction of the entity.

8. A method of determining a location of an object associated to a radio frequency (RF) node, comprising:
    obtaining a first signal measurement of an electromagnetic signal associated to the RF node at a first moment;
    obtaining at least one initial candidate location of the RF node based at least in part on the first signal measurement;
    assigning at least one moving step length for each of the at least one initial candidate location;
    obtaining a second signal measurement of the electromagnetic signal associated to the RF node at a second moment;
    updating location information of each of the at least one initial candidate location based on the assigned moving step length and a number of steps the objects moves between the first moment and the second moment to obtain at least one updated candidate location;
    for each of the at least one updated candidate location, determining a proximate fingerprint of the signal propagation parameter, which is pre-sampled at a sampling point geographically proximate to the updated candidate location;

ranking the at least one updated candidate location based at least in part on a comparison of the second signal measurement of the electromagnetic signal associated to the RF node at the second moment and the respective determined proximate fingerprint of the signal propagation parameter;

further updating the at least one updated candidate location based on the ranking; and determining the location of the object based at least in part on the further updated candidate location and the second signal measurement.

9. The method of claim 8, wherein the further updating the at least one updated candidate location includes:

removing an updated candidate location having a ranking lower than a threshold from being used in the determining of the location.

10. The method of claim 8, wherein the ranking comprises:

receiving a fingerprint map including fingerprints of the electromagnetic signal sampled at multiple sampling locations.

11. The method of claim 9, further comprising replacing the removed updated candidate location with a new updated candidate location determined using a moving step length of a different updated candidate location having a ranking higher than the threshold.

12. The method of claim 9, further comprising:

determining an aggregation degree of the at least one updated candidate location based on the ranking of each updated candidate location;

comparing the determined aggregation degree with an aggregation threshold; and in response to the determined aggregation degree does not match the aggregation threshold, removing the updated candidate location having the ranking lower than the threshold.

13. The method of claim 8, wherein the obtaining the at least one initial candidate locations of the RF node includes mapping the first signal measurement with a pre-generated signal fingerprint map to generate the at least one initial candidate locations.

14. The method of claim 8, wherein a signal measurement includes at least one of a signal strength of an electromagnetic signal received by the RF node or a signal strength of an electromagnetic signal received from the RF node.

15. The method of claim 8, wherein the number of steps the objects moves between the first moment and the second moment is determined through a different wearable computing device associated to the entity.

16. A wearable device, comprising:

a radio frequency (RF) component;

one or more processors; and memory having computer-executable components stored thereon, which when executed by the one or more processor, configures the wearable device to perform acts comprising:

obtaining a signal propagation parameter of the RF component measured at a first time point;

determine at least one first location point based at least in part on the signal propagation parameter measured at the first time point;

assigning at least one candidate moving step length to the at least one first location point;

determining a number of movement steps and a direction of movement made by a person wearing the wearable device from the first time point to a second time point;

obtain at least one second location point based on the at least one first location point, the assigned at least one candidate moving step length, the number of movement steps, and the direction of movement;

obtaining a signal propagation parameter of the RF component measured at the second time point;

for each of the at least one second location point, determining a proximate fingerprint of the signal propagation parameter, which is pre-sampled at a sampling point geographically proximate to the second location point;

ranking the at least one second location point based on comparing the signal propagation parameter of the RF component measured at the second time point with a respective proximate fingerprint of the signal propagation parameter of each of the at least one second location point;

selecting a candidate moving step length of a second location point having a ranking higher than a threshold;

determining a step length of the person wearing the wearable device based on the selected candidate moving step length; and outputting the determined step length through the wearable device.

17. The wearable device of claim 16, wherein the signal propagation parameter of the RF component includes a signal strength associated with the RF component.

18. The wearable device of claim 16 wherein the ranking the second location point comprises:

receiving a fingerprint map of fingerprints of the signal propagation parameter, which are pre-sampled at a plurality of sampling points within a region the wearable device is located.

19. The wearable device of claim 16, wherein the wearable device is further configured to perform:

determining an aggregation degree of the at least one second location points based on the ranking of each second location point;

comparing the determined aggregation degree with an aggregation threshold;

in response to the determined aggregation degree does not match the aggregation threshold, updating the at least one second location point by replacing a second location point that includes a ranking lower than a ranking threshold with a new second location point generated using the selected candidate moving step length; and ranking of the updated at least one second location point based on the signal propagation parameter of the RF component measured at the second time point.

\* \* \* \* \*